US007557909B2

(12) United States Patent
Ogawa et al.

(10) Patent No.: US 7,557,909 B2
(45) Date of Patent: Jul. 7, 2009

(54) PRINTED MATTER INSPECTION DEVICE, PRINTING PRESS AND PRINTED MATTER INSPECTION METHOD

(75) Inventors: Masayasu Ogawa, Hiroshima (JP); Shinichiro Senoo, Hiroshima (JP); Shuichi Takemoto, Hiroshima (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 67 days.

(21) Appl. No.: 11/987,302

(22) Filed: Nov. 29, 2007

(65) Prior Publication Data

US 2008/0129987 A1 Jun. 5, 2008

(30) Foreign Application Priority Data

Dec. 4, 2006 (JP) ............................ 2006-327549

(51) Int. Cl.
*G01N 21/00* (2006.01)

(52) U.S. Cl. .................... 356/237.1; 356/445; 356/402; 250/559.44; 250/559.4

(58) Field of Classification Search ... 356/237.1–237.5, 356/73, 445, 402, 425; 250/548, 559.4, 559.44; 400/708; 101/181, 219
See application file for complete search history.

(56) References Cited

U.S. PATENT DOCUMENTS

| | | | | |
|---|---|---|---|---|
| 4,165,465 | A * | 8/1979 | Kanatani et al. | 250/559.44 |
| 4,488,808 | A * | 12/1984 | Kato | 356/73 |
| 4,770,978 | A * | 9/1988 | Matsuzaka et al. | 430/363 |
| 5,841,897 | A * | 11/1998 | Numakura et al. | 382/163 |
| 6,028,320 | A * | 2/2000 | Uhling | 250/559.44 |

FOREIGN PATENT DOCUMENTS

| | | | |
|---|---|---|---|
| JP | 2003-291312 | B2 | 10/2003 |
| JP | 2004-266449 | A | 9/2004 |
| JP | 2004-266449 | B2 | 9/2004 |

* cited by examiner

*Primary Examiner*—Hoa Q Pham
(74) *Attorney, Agent, or Firm*—Kanesaka Berner & Partners

(57) ABSTRACT

A printed matter inspection device includes a light source that irradiates a color printed matter as an inspection object with illuminating light, a detector that detects the quantity of reflected light of each of a plurality of different color light beams from among reflected light reflected by the inspection object, and a controller that controls a timing of acquiring a detection signal of each of the color light beams from the detector. The controller acquires a detection signal of selected one of the different color light beams for one of a plurality of non-print areas on the inspection object. The controller acquires a detection signal of newly selected one of the different color light beams for another one of the non-print areas.

7 Claims, 12 Drawing Sheets

PRINTED MATTER INSPECTION DEVICE, PRINTING PRESS AND PRINTED MATTER INSPECTION METHOD

BACKGROUND OF THE INVENTION

1. Field of the Invention

The present invention relates to a printed matter inspection device, a printing press, and a printed matter inspection method.

This application is based on Japanese Patent. Application No. 2006-327549, the content of which is incorporated herein by reference.

2. Description of Related Art

In general, an inspection is required for a printed matter printed with a printing press so as to check the printing quality, such as stain, misregistration, and excess or insufficiency in printing density of the printed matter. A printing press usually has an inspection device for such an inspection. The inspection device includes an image reader that reads an image of a pattern on a printed matter. The inspection device inspects the printed matter on the basis of the image read with the image reader (for example, see the Publication of Japanese Patent. No. 3790490).

For reading the image, the inspection device irradiates a printed matter with light, and detects reflected light reflected by the printed matter. A popular image reader for a color printed matter employs, for example, a typical light source or a plurality of light emitting diodes (LEDs) as a device for irradiating a printed matter with light (for example, see the Publication of Japanese Patent. No. 3801571).

Unfortunately, the quantity of light emitted from the LEDs may change (drift) with time, and hence, using the LEDs as the device for emitting illuminating light may result in an inaccurate inspection for the printing density or the like due to the time-lapse change in the quantity of light.

Owing to this, in the inspection device with the LEDs, it is necessary to measure the time-lapse change in the quantity of light emitted from the LEDs and to compensate the change in the quantity of light.

As a method of measuring the time-lapse change in the quantity of light emitted from the LEDs, a method is known that LEDs irradiate a non-print area, or a blank area on a printed matter with light and an inspection device detects the intensity of light reflected by the blank area so as to measure a time-lapse change in the quantity of light emitted from the LEDs. That is, a method is for detecting a blank level.

A printed matter usually has a non-print area between print areas. The method using the non-print area as a blank area is popular.

Such a non-print area tends to be narrowed because it is desired to reduce the cost of print sheets and to increase print areas.

A non-print area is an area with no pattern printed, however, the non-print area may not be always blank due to a stain or the like. This may further narrow an area for the measurement of the blank level in the non-print area.

The blank level of a color printed matter is measured by irradiating the color printed matter with a plurality of different color light beams while the color printed matter being conveyed, and time-dividing the quantity of each of reflected color light beams.

If the area for the measurement of the non-print area is narrowed, then an area (measurement area) used for the measurement of the quantity of one of the reflected color light beams may extend from the non-print area to the print area.

It is difficult to accurately measure the time-lapse change (blank level) in the quantity of light emitted from the LEDs as long as the measurement area contains the print area.

To solve the above-mentioned problem, a method is conceivable that reduces the period of acquiring an image during the detection of the blank level, and increases the number of inspection lines. Increasing the number of inspection lines, the measurement area with the color light beams may be located within the non-print area, so that the blank level can be accurately measured.

However, in order to increase the number of inspection lines, the clock frequency of a detector has to be heightened to correspond to the increase in the number of inspection lines.

An existing element corresponding to a low clock frequency does not correspond to a high clock frequency. It is necessary to entirely change components of the detector including a control circuit, thereby increasing the cost.

As the period of acquiring an image is reduced, an existing data transmission system for transmitting image data may not reliably transmit the image data because the data transmission rate is insufficient.

To solve this, a method is conceivable that reconfigures the data transmission system, however, the cost may be increased.

Also, time is necessary for stabilizing the output of a light-detecting amplifier provided in the detector, and hence, there is a limit for reducing the period of acquiring the image, resulting in a limit for increasing the number of inspection lines.

BRIEF SUMMARY OF THE INVENTION

The present invention is made to solve the above-mentioned problems, and an object of the present invention is to provide a printed matter inspection device capable of detecting a time-lapse change in the quantity of illuminating light emitted from a light source, by using a narrow blank area (non-print area) of a printed matter. The present invention also provides a printing press and a printed matter inspection method.

To attain the above object, the present invention provides the following configurations.

A first aspect of the present invention provides a printed matter inspection device, the device including a light source that irradiates a color printed matter as an inspection object with illuminating light, a detector that detects the quantity of reflected light of each of a plurality of different color light beams from among reflected light reflected by the inspection object, and a controller that controls a timing of acquiring a detection signal of each of the color light beams from the detector. The controller acquires a detection signal of selected one of the different color light beams for one of a plurality of non-print areas on the inspection object. The controller acquires a detection signal of newly selected one of the different color light beams for another one of the non-print areas.

With the first aspect of the present invention, since only the quantity of selected one of the reflected color light beams is detected for the one of the non-print areas, the detection signal of the quantity of selected one of the reflected color light beams can be acquired even using a narrow non-print area, as compared with a method in which the quantities of a plurality of reflected different color light beams are sequentially detected. Accordingly, the detection signal can be acquired for the narrow non-print area without reducing the period of acquiring the detection signal.

Meanwhile, as compared with the method of sequentially detecting the quantities of reflected different color light beams, when the size of the non-print area is equivalent, the number of detections for the quantity of selected one of the reflected color light beams increases. Thus, reliability of the detection signal can be improved because the number of detection signals to be acquired increases without reducing the period of acquiring the detection signal.

Since the color light beam selected for one of the non-print areas is different from that for another one of the non-print areas, detection signals of the quantities of all reflected different color light beams can be acquired.

Accordingly, the detection signals of the quantities of reflected different color light beams for the non-print areas can be obtained.

The same color light beam may be repeatedly selected from the plurality of different color light beams, as log as each of the color light beams is selected at least one time for all the plurality of non-print areas.

Preferably in the first aspect of the invention, the controller may control the timing of acquiring the detection signal by controlling a timing of intermittently irradiating each of the plurality of non-print areas with the illuminating light.

With this configuration, a timing at which the reflected light is reflected by the inspection object and a timing at which each of the plurality of reflected different color light beams enters the detector can be controlled by controlling the timing of emitting the illuminating light intermittently emitted on the non-print area. Thus, the subsequent detection of the quantity of reflected light with the detector and acquisition of the detection signal with the controller can be controlled in accordance with the emission timing of the illuminating light.

Preferably in the first aspect of the invention, the controller may control the timing of acquiring the detection signal input from the detector so as to be intermittent.

With this configuration, the controller does not acquire the detection signal even if the detection signal is continuously input to the controller from the detector unless the controller actively acquires the detection signal. In other words, even if the non-print area is continuously irradiated with the illuminating light, the timing of acquiring the detection signal to the controller can be controlled.

Preferably in the first aspect of the invention, the light source may include a plurality of light sources respectively emit the different color light beams.

With this configuration, by selecting one of the light sources, one color light beam for illuminating the non-print area can be selected. When the selected one of the color light beams illuminates the non-print area, the reflected light of the selected one of the color light beams enters the detector. Accordingly, it is not necessary to provide a filter or the like at the detector to transmit predetermined reflected light.

Preferably in the first aspect of the invention, the light source may emit white light, and the detector may have a plurality of filters that respectively transmit the reflected different color light beams.

With such a configuration, the white light is reflected by the non-print area, and enters one of the plurality of filters. The filter of a given color light beam transmits only reflected light corresponding to that color from among the reflected white light. The detector detects the quantity of reflected light corresponding to that color. Thus, by selecting the one of the filters to which the reflected white light enters, the color light beam to be detected by the detector can be selected. Thus, the plurality of light sources that emit different color light beams do not have to be provided.

A second aspect of the present invention provides a printing press including the printed matter inspection device according to the first aspect of the invention.

With the second aspect of the invention, since the printed matter inspection device according to the first aspect of the invention is provided, a time-lapse change in the quantity of illuminating light emitted from the light source can be detected even using a narrow non-print area of the inspection object.

A third aspect of the invention provides a printed matter inspection method, the method including an inspection step of time-dividing and sequentially detecting the quantities of a plurality of reflected different color light beams reflected by one of a plurality of print areas on a color printed matter as an inspection object, and a detection step of detecting the quantity of selected one of the plurality of reflected different color light beams for one of a plurality of non-print areas adjacent to the one of the print areas. The inspection step and the detection step are repeatedly performed. One color light beam is newly selected from the plurality of different color light beams every time when the detection step is performed.

With the third aspect of the invention, since only the quantity of selected one of the reflected color light beams is detected for the one of the non-print areas, the detection signal of the quantity of selected one of the reflected color light beams can be acquired even using a narrow non-print area, as compared with a method in which the quantities of a plurality of reflected different color light beams are sequentially detected. Accordingly, the detection signal can be acquired for the narrow non-print area without reducing the period of acquiring the detection signal.

Meanwhile, as compared with the method of sequentially detecting the quantities of reflected different color light beams, when the size of the non-print area is equivalent, the number of detections for the quantity of selected one of the reflected color light beams increases. Thus, reliability of the detection signal can be improved because the number of detection signals to be acquired increases without reducing the period of acquiring the detection signal.

Since the color light beam selected for one of the non-print areas is different from that for another one of the non-print areas, detection signals of the quantities of all reflected different color light beams can be acquired. Accordingly, the detection signals of the quantities of reflected different color light beams for the non-print areas can be obtained.

The same color light beam may be repeatedly selected from the plurality of different color light beams, as log as each of the color light beams is selected at least one time for all the plurality of non-print areas.

With the first, second, and third aspects of the present invention, the quantity of reflected light of only a selected color light beam is detected for one of the non-print areas. Accordingly, a time-lapse change in the quantity of illuminating light emitted from the light source can be detected using a narrow non-print area.

DETAILED DESCRIPTION OF THE INVENTION

A printing press according to an embodiment of the present invention is described with reference to FIGS. 1 to 14.

Figure 1:
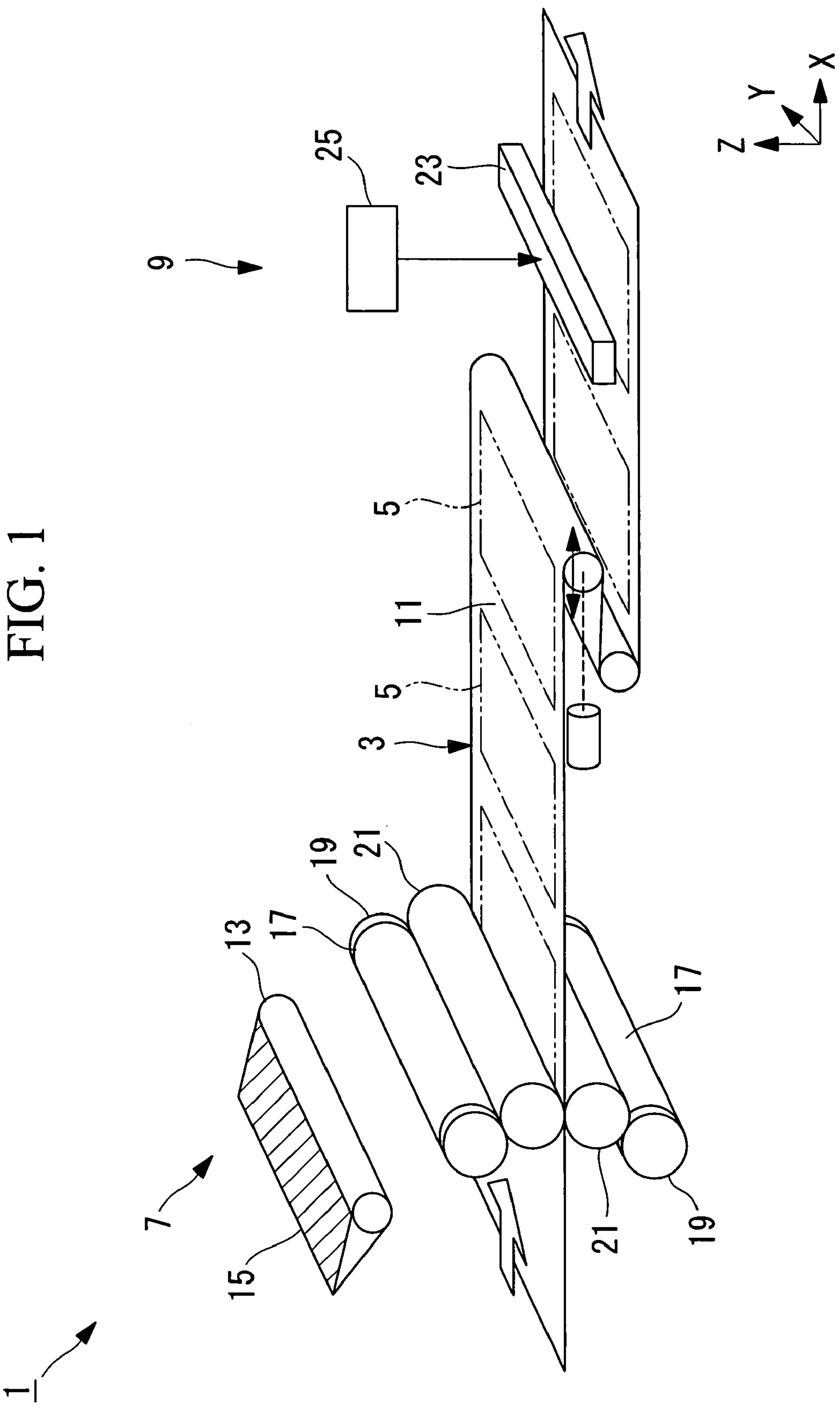
FIG. 1 is a schematic illustration showing the overview of a printing press according to an embodiment of the present invention.

FIG. 1 is a schematic illustration showing the overview of the printing press according to the embodiment of the present invention.

As shown in FIG. 1, a printing press 1 includes a printing unit 7 that prints a print pattern (inspection object) 5 on a print sheet 3, and an inspection unit (printed matter inspection device) 9 that inspects the print pattern 5 printed on the print sheet 3.

The print sheet 3 has an area with the print pattern 5 printed thereon (print area), and a non-print area 11 with no pattern printed thereon.

The printing unit 7 includes an ink fountain roller 13 and an ink key 15 that supply a plate cylinder 19 with ink, the plate cylinder 19 having a plate 17 with the print pattern 5 provided thereon, and a blanket cylinder 21 that prints the print pattern 5 on the print sheet 3.

Figure 2:
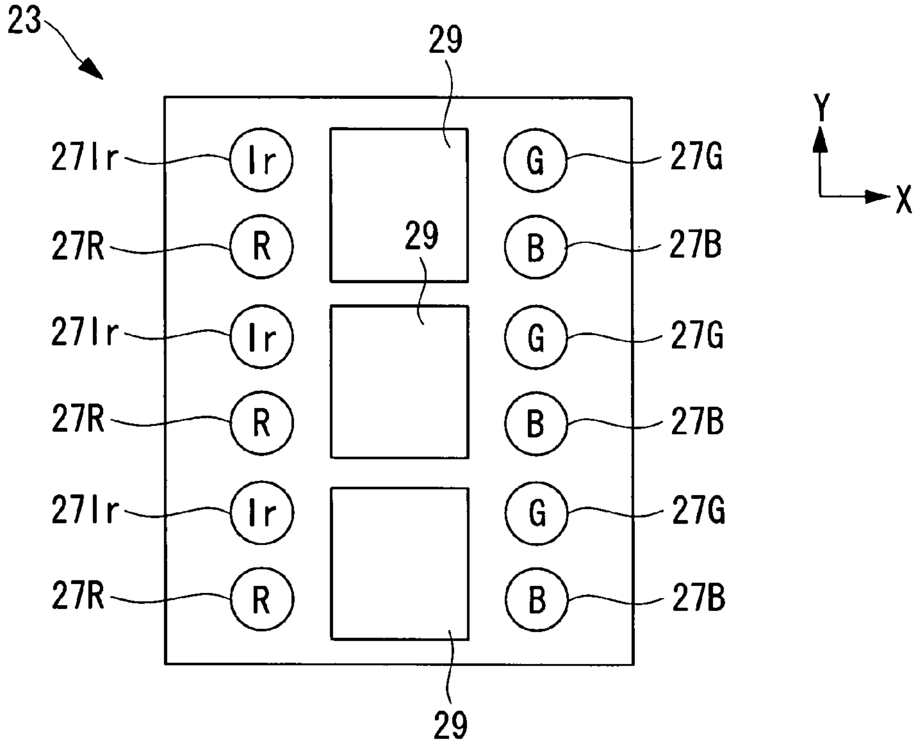
FIG. 2 is a schematic illustration showing an arrangement of a pattern detector in FIG. 1.

FIG. 2 is a schematic illustration showing an arrangement of a pattern detector in FIG. 1.

The inspection unit 9 inspects the print pattern 5 printed on the print sheet 3 for the printing density thereof. The inspection unit 9 includes a pattern detector 23 that detects the print pattern 5 printed, and a controller 25 that controls the pattern detector 23.

The pattern detector 23 extends over the width of the print sheet 3 in a direction (Y-direction) substantially orthogonal to a conveyance direction of the print sheet 3 (X-direction in FIG. 1). As shown in FIG. 2, the pattern detector 23 has light sources 27R, 27G, 27B, and 27Ir, which respectively irradiate the print sheet 3 with color light beams of red (R), green (G), blue (B), and near infrared (Ir), and reflected light detectors 29 that detect reflected light reflected by the print sheet 3.

The color light beams with wavelengths of R, G, B, and Ir respectively correspond to inks of cyan (C), magenta (M), yellow (Y), and black (K), which are used for printing of the print sheet 3.

When the color light beam R is emitted on the print sheet 3, areas printed using cyan and black inks can be detected. Since the black ink is reactive to either of color wavelengths of R, G, and B, the near-infrared light beam (Ir), which is only reacted by the black ink, is used for detecting an area printed using the black ink, to eliminate the area printed using the black ink from the areas reactive to the color wavelengths of R, G, and B. With this elimination, areas printed with the cyan, magenta, and yellow inks can be detected.

The light sources 27R, 27G, 27B, and 27Ir are light emitting diodes (LEDs) that emit color light beams of R, G, B, and Ir, and are arranged in two lines extending along the Y-direction with the reflected light detectors 29 interposed between the two lines. In this embodiment, for example, the light sources 27G and 27B are alternately arranged in one line, whereas the light sources 27R and 27Ir are alternately arranged in the other line, when the pattern detector 23 is viewed from the print sheet 3.

Figure 3:
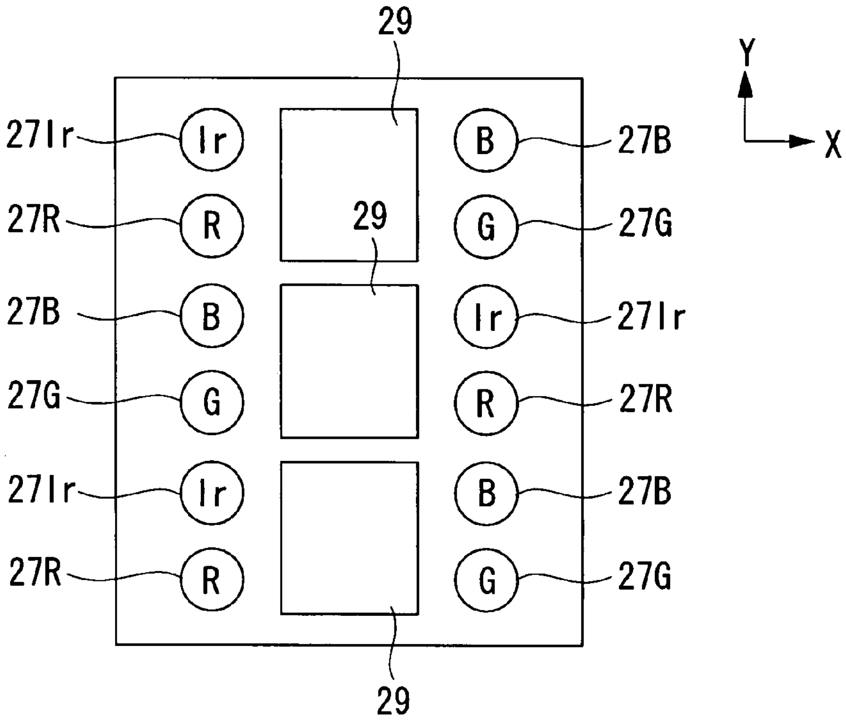
FIG. 3 is a schematic illustration showing another arrangement of a pattern detector in FIG. 2.

FIG. 3 is a schematic illustration showing another arrangement of a pattern detector in FIG. 2.

The arrangement pattern of the light sources 27R, 27G, 27B, and 27Ir is not limited to that shown in FIG. 2. As shown in FIG. 3, the light sources 27R, 27G, 27B, and 27Ir may be arranged such that the light sources 27B, 27G, 27Ir, 27R, 27B, and 27G are arranged in that order in one line, whereas the light sources 27Ir, 27R, 27B, 27G, 27Ir, and 27R are arranged in that order in the other line.

While the light sources 27R, 27G, 27B, and 27Ir are arranged in the two lines with the reflected light detectors 29 interposed between the two lines as shown in FIGS. 2 and 3, both the two lines of the light sources 27R, 27G, 27B, and 27Ir may be arranged on one side of the reflected light detectors 29, as long as the light sources 27R, 27G, 27B, and 27Ir are located at positions that allow the color light beams emitted from the light sources 27R, 27G, 27B, and 27Ir to be reflected by the print sheet 3 and to enter the reflected light detectors 29.

While the light-emitting diodes are used as the light sources for emitting the color light beams with the wavelengths of R, G, B, and Ir in the above description, the light-emitting diodes do not have to be used. Filters that only transmit the corresponding color light beams with the wavelengths of R, G, B, and Ir, respectively, may be provided at light sources that emit white light, so as to emit the color light beams with the wavelengths of R, G, B, and Ir.

As shown in FIG. 2, the reflected light detectors 29 are photodiodes that detect reflected light, and are arranged in the Y-direction at the center of the pattern detector 23. In this embodiment, for example, the length of each of light reception areas (hereinafter, referred to as pixels) 31 on the print sheet 3 to be detected with the reflected light detectors 29 is 4 mm in the conveyance direction of the print sheet 3 (X-direction).

The reflected light detectors 29 may be photodiodes as mentioned above, or may be charge coupled devices (CCDs) or the like.

The light sources may emit the color light beams with the wavelengths of R, G, B, and Ir and the reflected light detectors 29 may detect the reflected color light beams as mentioned above. Alternatively, the light sources may emit the white light, the filters that are located at light-detection surfaces of the reflected light detectors 29 may transmit the corresponding color light beams of the wavelengths of R, G, B, and Ir, and the reflected light detectors 29 may detect the reflected and transmitted color light beams with the wavelengths of R, G, B, and Ir.

With such a configuration, the white light is reflected by the non-print area 11, and enters the plurality of filters. The filter of a given color light beam transmits only reflected light corresponding to that color from among the reflected white light. The reflected light detectors 29 detect the quantity of reflected light corresponding to that color. Thus, by selecting the one of the filters to which the reflected white light enters, the color light beam to be detected by the reflected light detectors 29 can be selected. Thus, the plurality of light sources 27R, 27G, 27B, and 27Ir that emit different color light beams do not have to be provided.

The controller 25 controls emission timings of the color light beams from the light sources 27R, 27G, 27B, and 27Ir, and also receives an output signal output from the pattern detector 23.

A method of controlling the light sources 27R, 27G, 27B, and 27Ir using the controller 25, and a method of determining the output signal output from the pattern detector 23, are described later.

Next, the operation of the inspection unit 9 of the printing press 1 having the above-described configuration is described.

A printing method of the printing press 1 is similar to that of a related art, and hence, its description is omitted.

Figure 4:
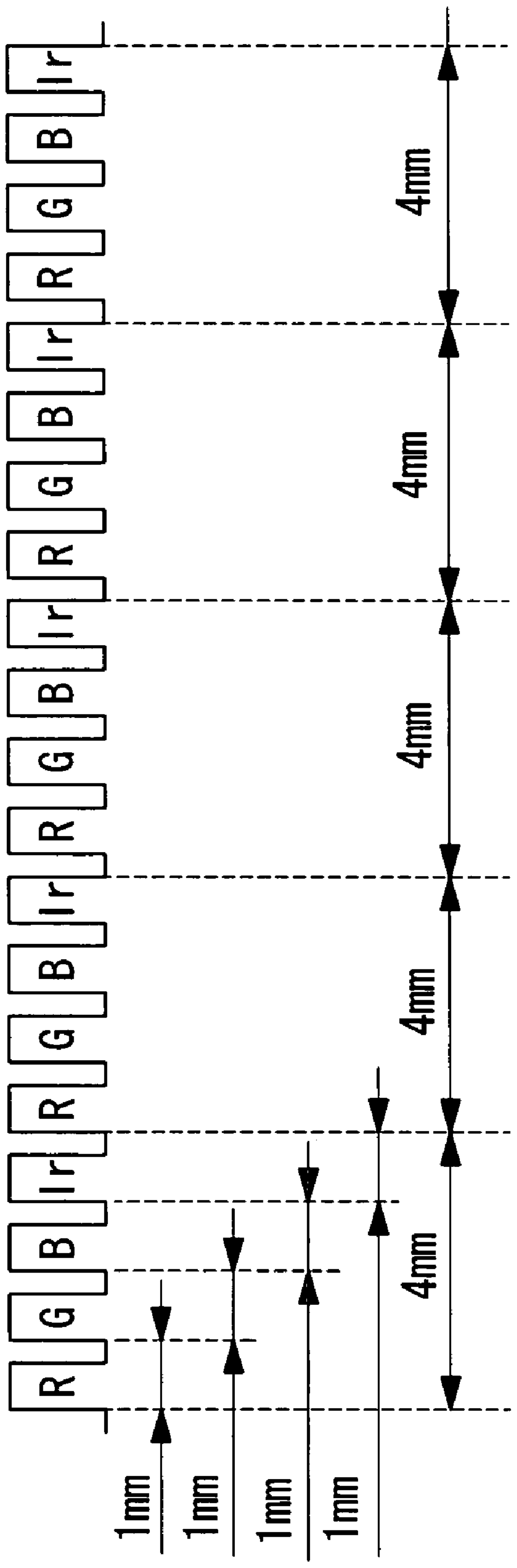
FIG. 4 is a timing chart for explaining a light-emitting pattern of a light source in FIG. 2 for a print pattern 5.
Figure 5:
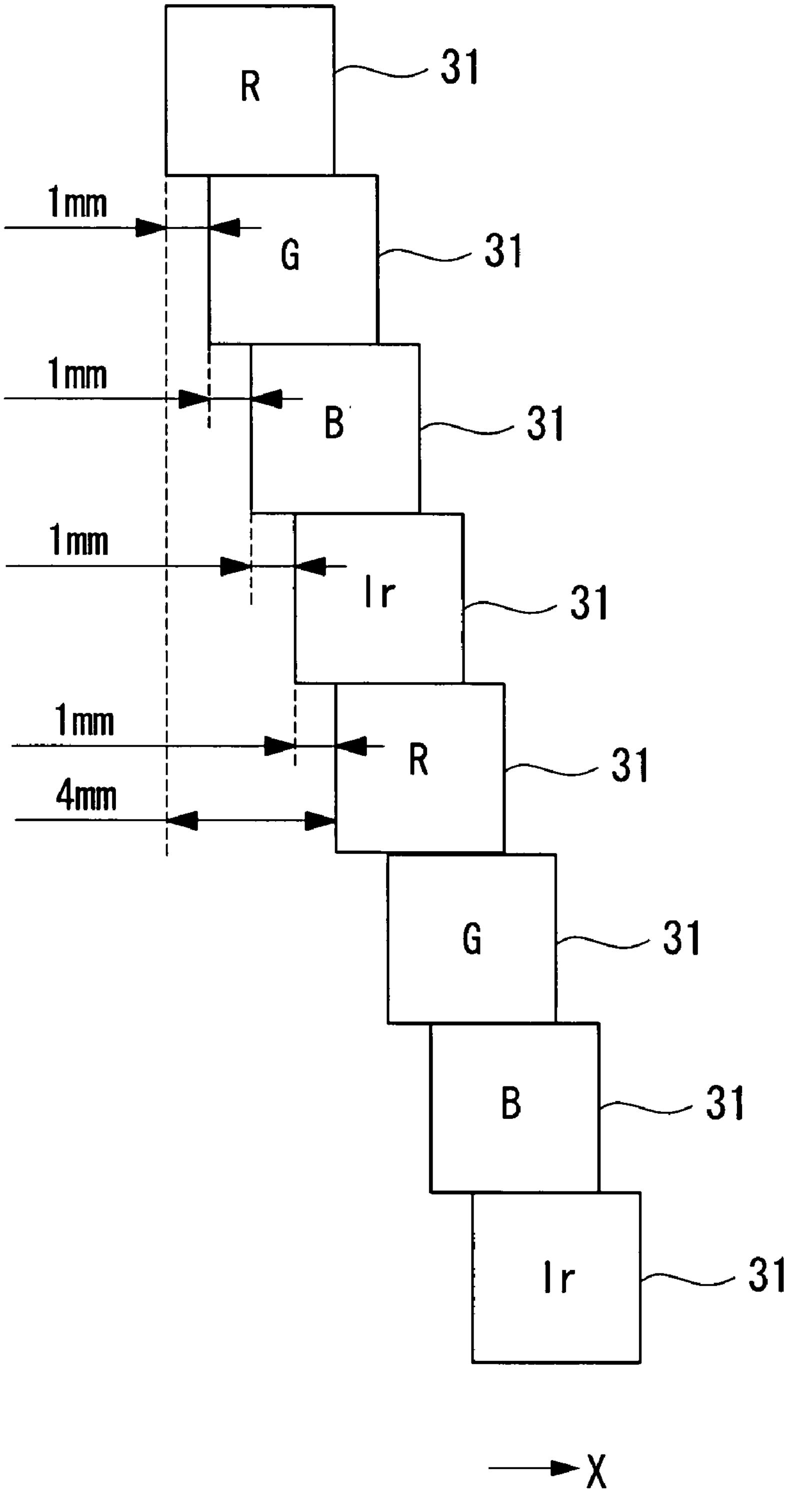
FIG. 5 is a schematic illustration for explaining an arrangement of pixels with color light beams R, G, B, and Ir in FIG. 4.

FIG. 4 is a timing chart for explaining a light-emitting pattern of a light source in FIG. 2 for the print pattern 5. FIG. 5 is a schematic illustration for explaining an arrangement of pixels with the color light beams R, G, B, and Ir in FIG. 4.

As shown in FIG. 4, the controller 25 controls the light sources 27R, 27G, 27B, and 27Ir so as to intermittently and sequentially emit the color light beams of R, G, B, and Ir on the print pattern 5. As shown in FIG. 5, the emission timings of the color light beams are controlled such that the positions of the pixels 31 on the print sheet 3 are shifted by 1 mm each. When the color light beams R, G, B, and Ir are repeatedly emitted, a set of the color light beams R, G, B, and Ir is repeatedly emitted with a pitch of 4 mm, the pitch being equivalent to the length of each pixel 31 of the reflected light detectors 29.

In FIG. 5, the positions of the pixels 31 corresponding to the color light beams R, G, B, and Ir are shifted in the vertical direction for convenience of the description.

The emitted color light beams R, B, G, and Ir are reflected by the print pattern 5 and enter the reflected light detectors 29 as the reflected light. The reflected light detectors 29 generate detection signals on the basis of the quantities of reflected light beams, and input the signals to the controller 25. The controller 25 inspects the print pattern 5 for the printing density thereof on the basis of the input detection signals (inspection step).

Herein, the method of detecting the blank level, the method which is the feature of this embodiment, is described.

The controller 25 detects the quantity of reflected light reflected by a blank sheet (hereinafter, referred to as detection of the blank level) by utilizing the non-print area 11 on the print sheet 3, so as to detect time-lapse changes in the quantities of color light beams emitted from the light sources 27R, 27B, 27G, and 27Ir. Using the time-lapse changes in the detected quantities of emitted light beams as the standard, accuracy of the inspection of the print pattern 5 for the printing density can be maintained.

Figure 6:
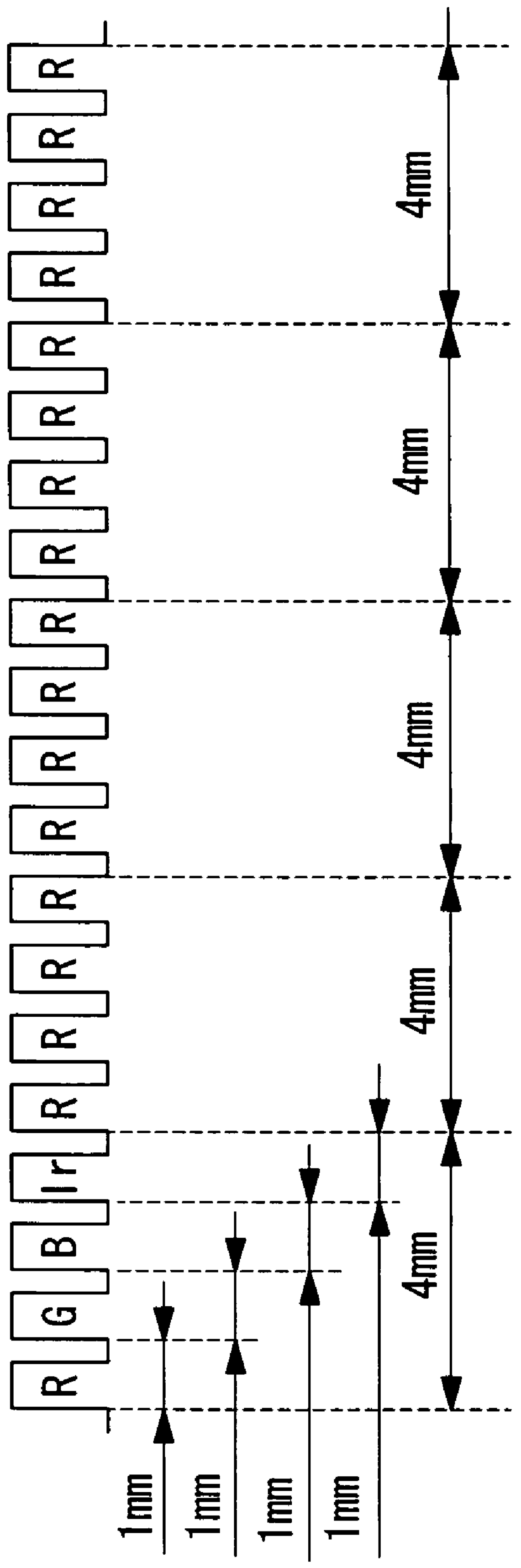
FIG. 6 is a timing chart for explaining a light-emitting pattern of the color light beam R with the light source in FIG. 2 for a non-print area.
Figure 7:
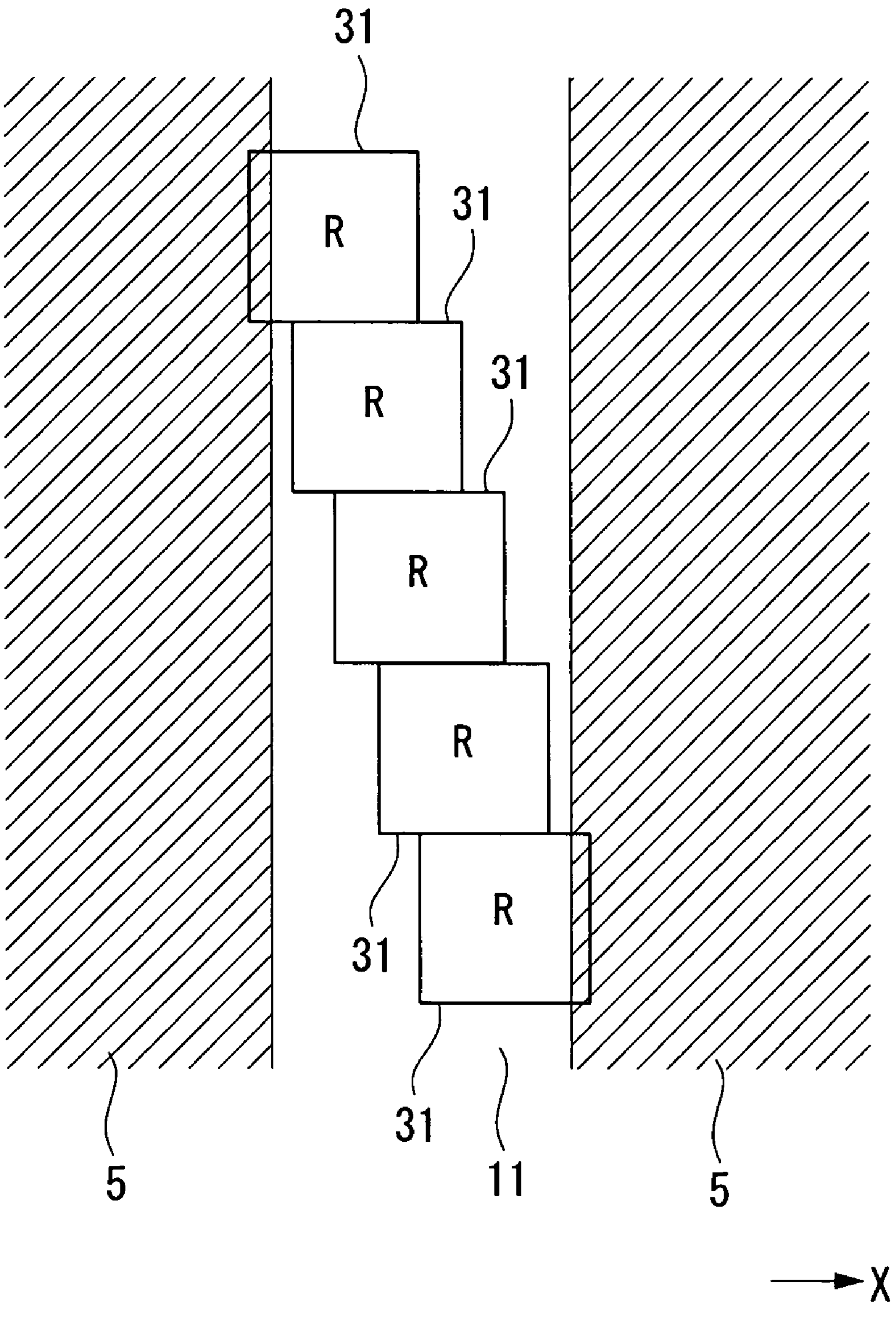
FIG. 7 is a schematic illustration for explaining an arrangement of pixels with the color light beam R in FIG. 6.

FIG. 6 is a timing chart for explaining a light-emitting pattern of the color light beam R with the light source in FIG. 2 for a non-print area. FIG. 7 is a schematic illustration for explaining an arrangement of pixels with the color light beam R in FIG. 6.

When the non-print area 11 enters an inspection area of the reflected light detectors 29, the controller 25 controls the light source 27R to intermittently emit the color light beam R as shown in FIG. 6. The emission interval of the color light beam R is equivalent to that of the inspection for the printing density as mentioned above.

As shown in FIG. 7, the positions of the pixels 31 with the color light beam R are shifted by 1 mm each in the conveyance direction of the print sheet 3 (X-direction), and the pixels 31 are partially overlapped with one another.

Figure 8:
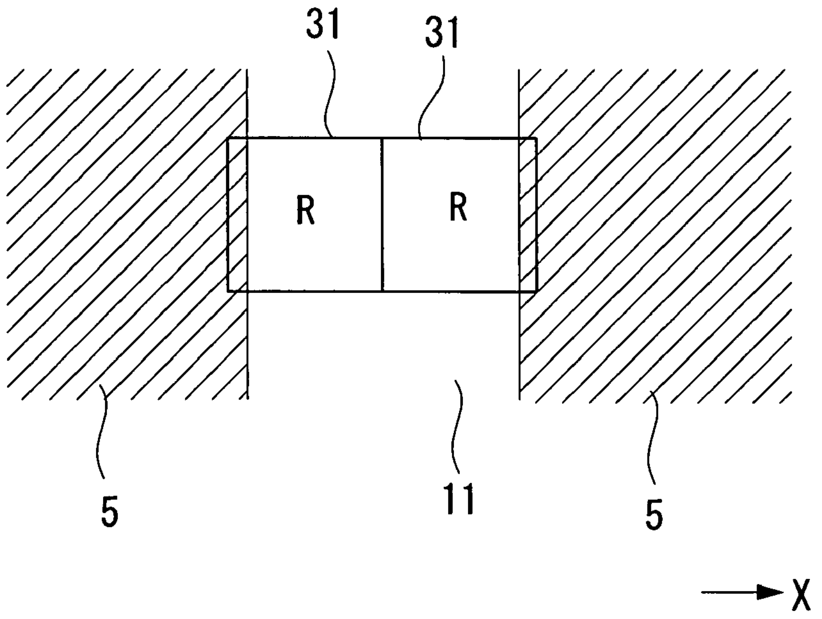
FIG. 8 is a schematic illustration for explaining an arrangement of pixels with a color light beam R according to a related art.
Figure 9:
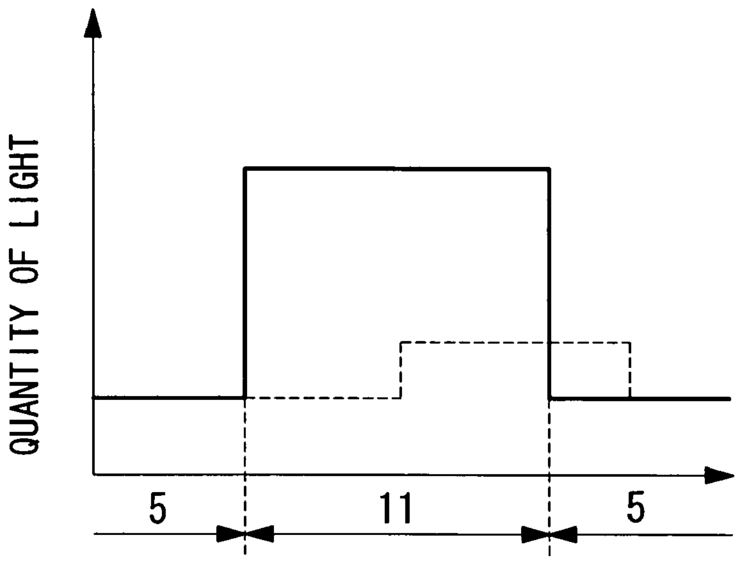
FIG. 9 is a graph for explaining the quantity of light at the pixels with the color light beam R of the related art and that of this embodiment.

FIG. 8 is a schematic illustration for explaining an arrangement of pixels with a color light beam R according to a related art. FIG. 9 is a graph for explaining the quantity of light at a pixel with the color light beam R of the related art and that of this embodiment.

As shown in FIG. 8, the positions of the pixels 31 with the color light beam R according to the related art are shifted by 4 mm each in the conveyance direction of a print sheet (X-direction), and pixels 31 are adjacent to one another. If the non-print area 11 is narrow, the pixels 31 may contain a part of the print pattern 5, and there is no pixel 31 containing only the non-print area 11.

The quantity of light at the pixels 31 according to the related art decreases as indicated by a dotted line in FIG. 9. In contrast, the quantity of light at the pixels 31 according to this embodiment does not decrease as indicated by a solid line in FIG. 9 because there is provided the pixels 31 containing only the non-print area 11.

The color light beam R emitted from the light source 27R is reflected by the non-print area 11. The reflected light detectors 29 detect the reflected light of the color light beam R, and input the detection signal to the controller 25. The controller 25 uses the detection signal of the color light beam R and the reflectance of the light when being reflected by the blank sheet, so as to calculate the quantity of color light beam R emitted from the light source 27R, and to obtain the time-lapse change in the quantity of light (detection step).

When the non-print area 11 leaves the inspection area of the reflected light detectors 29, and the print pattern 5 enters the inspection area of the reflected light detectors 29, the inspection for the printing density mentioned above is performed again (inspection step).

Figure 10:
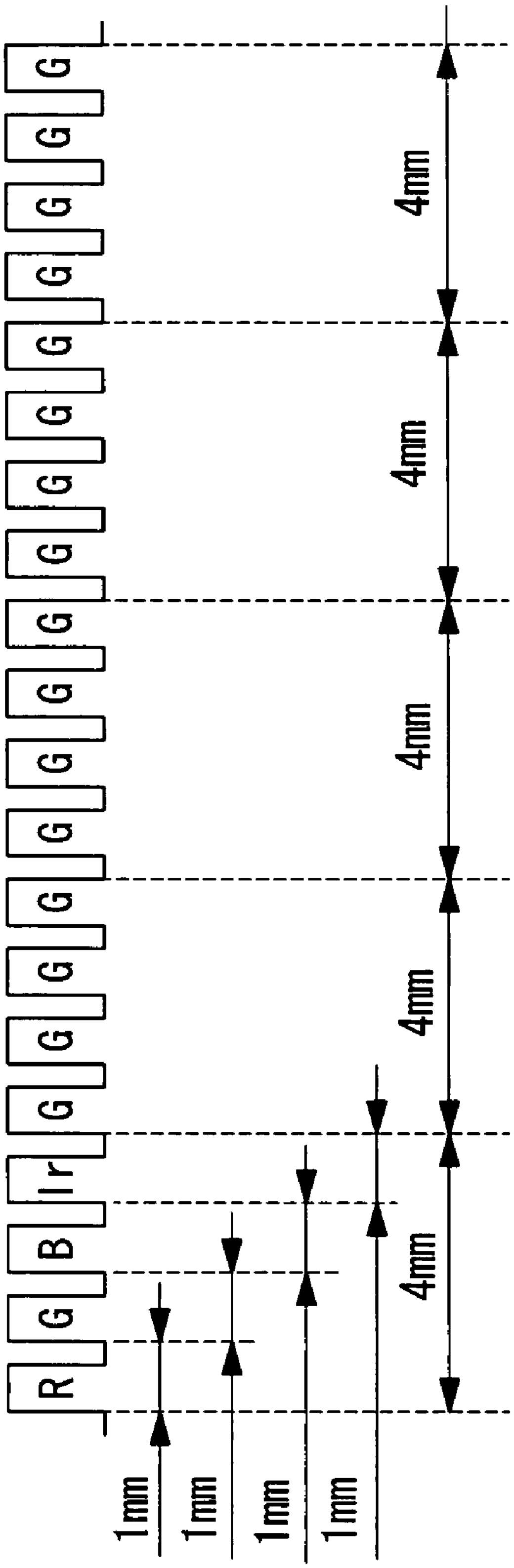
FIG. 10 is a timing chart for explaining a light-emitting pattern of the color light beam G with the light source in FIG. 2 for a non-print area.
Figure 11:
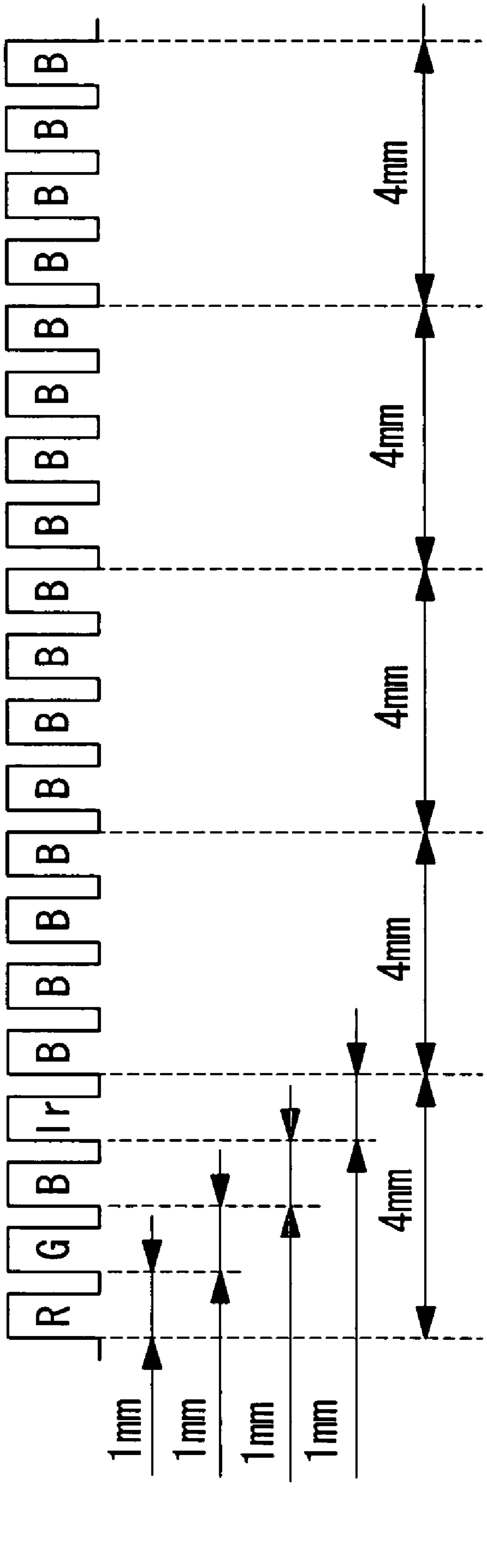
FIG. 11 is a timing chart for explaining a light-emitting pattern of the color light beam B with the light source in FIG. 2 for a non-print area.
Figure 12:
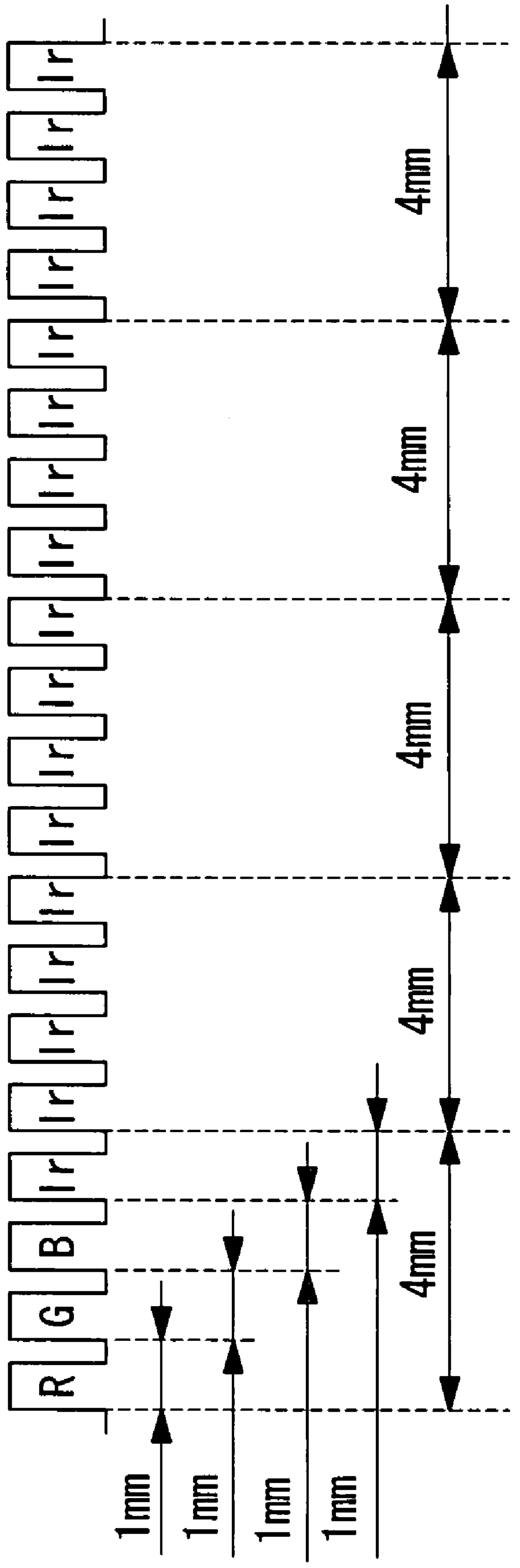
FIG. 12 is a timing chart for explaining a light-emitting pattern of the color light beam Ir with the light source in FIG. 2 for a non-print area.

FIG. 10 is a timing chart for explaining a light-emitting pattern of the color light beam G with the light source in FIG. 2 for a non-print area. FIG. 11 is a timing chart for explaining a light-emitting pattern of the color light beam B with the light source in FIG. 2 for a non-print area. FIG. 12 is a timing chart for explaining a light-emitting pattern of the color light beam Ir with the light source in FIG. 2 for a non-print area.

When the non-print area 11 enters the inspection area of the reflected light detectors 29, the controller 25 controls the light source 27G to intermittently emit the color light beam G as shown in FIG. 10. The measurement of the quantity of reflected color light beam G reflected by the non-print area 11 is similar to that of the above-described color light beam R, and hence, its description is omitted.

When the non-print area 11 leaves the inspection area of the reflected light detectors 29 and the print pattern 5 enters the inspection area of the reflected light detectors 29, the above-described inspection for the printing density is performed again, and the measurements for the quantities of reflected color light beams B and Ir reflected by the non-print area 11 are performed.

The controller 25 may determine that the non-print area 11 enters the inspection area of the reflected light detectors 29, if a value of the detection signal becomes larger than a predetermined value, or on the basis of a signal corresponding to the position of the non-print area 11 output from the printing unit 7.

In a case where the plurality of pixels 31 contain only the non-print area 11 as described above, a mean value of detection signals for the plurality of pixels 31 may be used. In the case where the plurality of pixels 31 contain only the non-print area 11, it can be determined that the area detected with the reflected light detectors 29 is not a non-print area contained in the print pattern 5, but it may be a non-print area 11 provided between the print patterns 5.

With this configuration, the quantity of reflected light of only a selected color light beam, for example, the color light beam R can be detected. Hence, as compared with the method of sequentially detecting the quantities of reflected color light beams R, G, B, and Ir, the detection signal of the quantity of reflected color light beam R can be acquired even using the narrow non-print area 11. That is, the above detection signal can be acquired using the narrow non-print area 11 without reducing the period of acquiring the detection signal. Accordingly, the time-lapse changes in the quantities of color light beams R, G, B, and Ir emitted from the light sources 27R, 27G, 27B, and 27Ir can be detected using the narrow non-print area 11.

Meanwhile, as compared with the method of sequentially detecting the quantities of reflected color light beams R, G, B, and Ir, when the size of the non-print area 11 is equivalent, the number of detections for the quantity of selected one of the reflected color light beams, for example, the color light beam R increases. Therefore, reliability of the detection signal can be improved because the number of detection signals to be acquired increases without reducing the period of acquiring the detection signal.

If a selected color light beam, for example, the color light beam R, for one non-print area 11 is different from a selected color light beam for another non-print area 11, the detection signals for the quantities of all reflected color light beams R, G, B, and Ir can be acquired. Accordingly, the detection signals for the quantities of reflected different color light beams for the non-print areas 11 can be obtained.

In particular, when the non-print area 11 enters the inspection area, only the color light beam R is intermittently emitted, and when the print pattern 5 enters the inspection area, the above-described inspection for the printing density is performed. Then, when the non-print area 11 enters the inspection area, only the color light beam G is intermittently emitted, and when the print pattern 5 enters the inspection area, the above-described inspection for the printing density is performed. Then, when the non-print area 11 enters the inspection area, only the color light beam B is intermittently emitted, and when the print pattern 5 enters the inspection area, the above-described inspection for the printing density is performed. In this way, one of the color light beams R, G, B, and Ir may be sequentially emitted to one of non-print areas 11 every time when one of the non-print areas 11 enters the inspection area.

While the same color light beam may not be repeatedly selected from among the color light beams R, G, B, and Ir in this embodiment, the same color light beam may be repeatedly selected, as log as each of the color light beams R, G, B, and Ir is selected at least one time for all the non-print areas 11 on the print sheet 3.

Since the controller 25 controls the emission timings of the color light beams R, G, B, and Ir which are intermittently emitted to the non-print area 11, timings at which the color light beams are reflected by the non-print areas 11 on the print sheet 3, and timings at which the reflected color light beams R, G, B, and Ir enter the reflected light detectors 29 can be controlled. Thus, the subsequent detection of the quantity of reflected light with the reflected light detectors 29 and acquisition of the detection signals with the controller 25 can be controlled in accordance with the emission timings of the color light beams R, G, B, and Ir.

While the timings of measuring the quantities of reflected color light beams R, G, B, and Ir may be controlled by controlling the emission timings of the color light beams R, G, B, and Ir emitted from the light sources in this embodiment, the timings of the measurement for the quantities of reflected color light beams R, G, B, and Ir may be controlled by controlling the timings of acquiring the detection signals input to the controller 25 from the reflected light detectors 29.

With this configuration, the controller 25 does not acquire the detection signals even if the detection signals are continuously input to the controller 25 from the reflected light detectors 29 as long as the controller 25 actively acquires the detection signals. In other words, even if the non-print area 11 is continuously irradiated with the illuminating light, the timing of acquiring the detection signal to the controller 25 can be controlled.

The light-emitting diodes that emit the color light beams R, G, B, and Ir are used as the light sources 27R, 27G, 27B, and 27Ir, and hence, by selecting one of the light sources 27R, 27G, 27B, and 27Ir, a color light beam illuminating the non-print area 11 can be selected. When the selected one of the color light beams illuminates the non-print area 11, the reflected light of the selected one of the color light beams enters the reflected light detectors 29. Accordingly, it is not necessary to provide the filters or the like at the reflected light detectors 29 to transmit predetermined reflected light.

The technical scope of the present invention is not limited to the above-described embodiment, and various modifications can be made within the scope of the present invention.

For example, using digital image data or the like, if a non-print area is previously determined even if the area is contained in a print area, the detection of the blank level may be performed using the non-print area.

Figure 13:
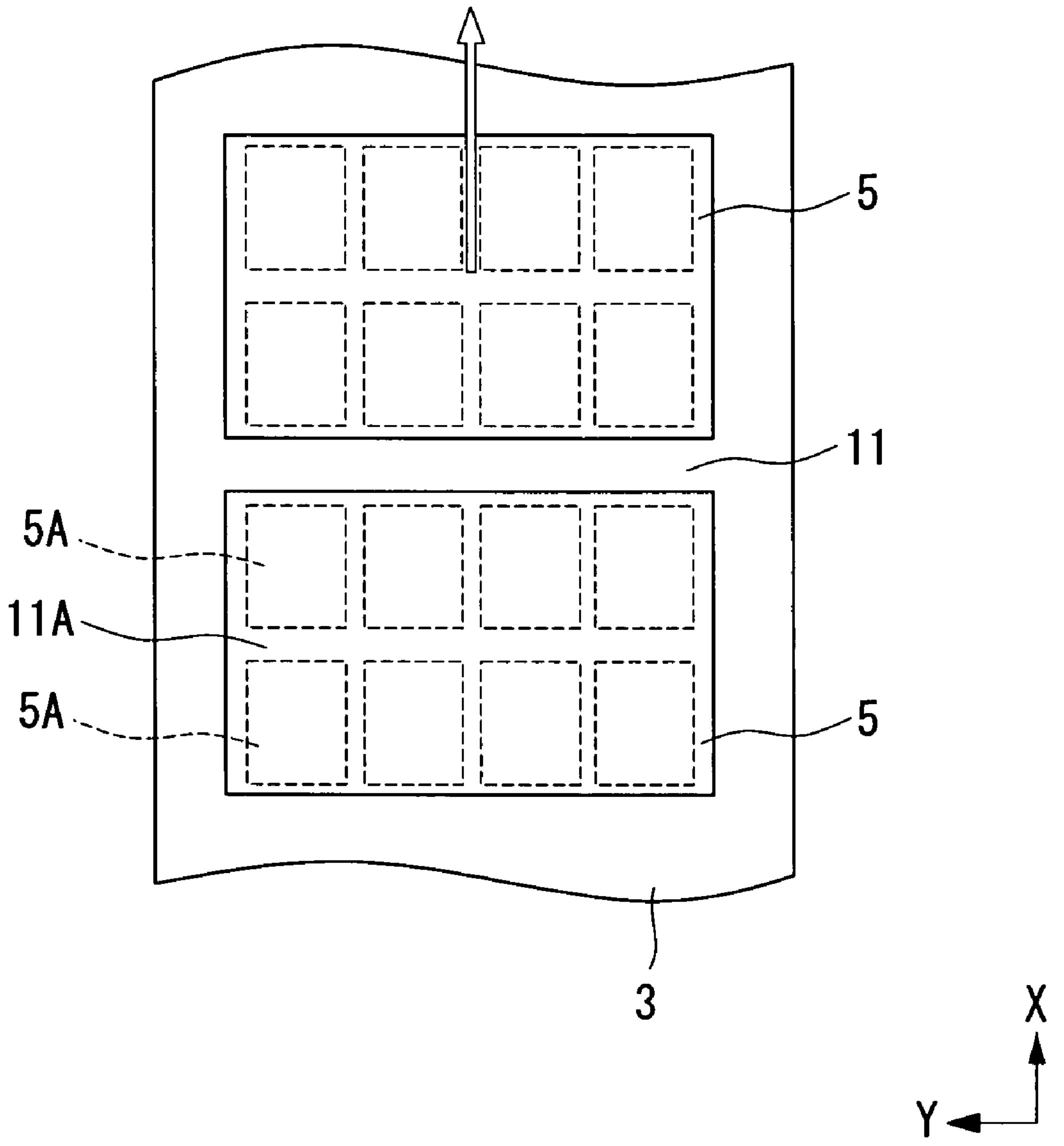
FIG. 13 is a schematic illustration for explaining another method of detecting a blank level.

FIG. 13 is a schematic illustration for explaining another method of detecting a blank level.

In particular, in a case of printing a book, as shown in FIG. 13, a non-print area 11A is present between print patterns 5A which correspond to pages of the book. Hence, the detection of the blank level may be performed using the non-print area 11A.

Figure 14:
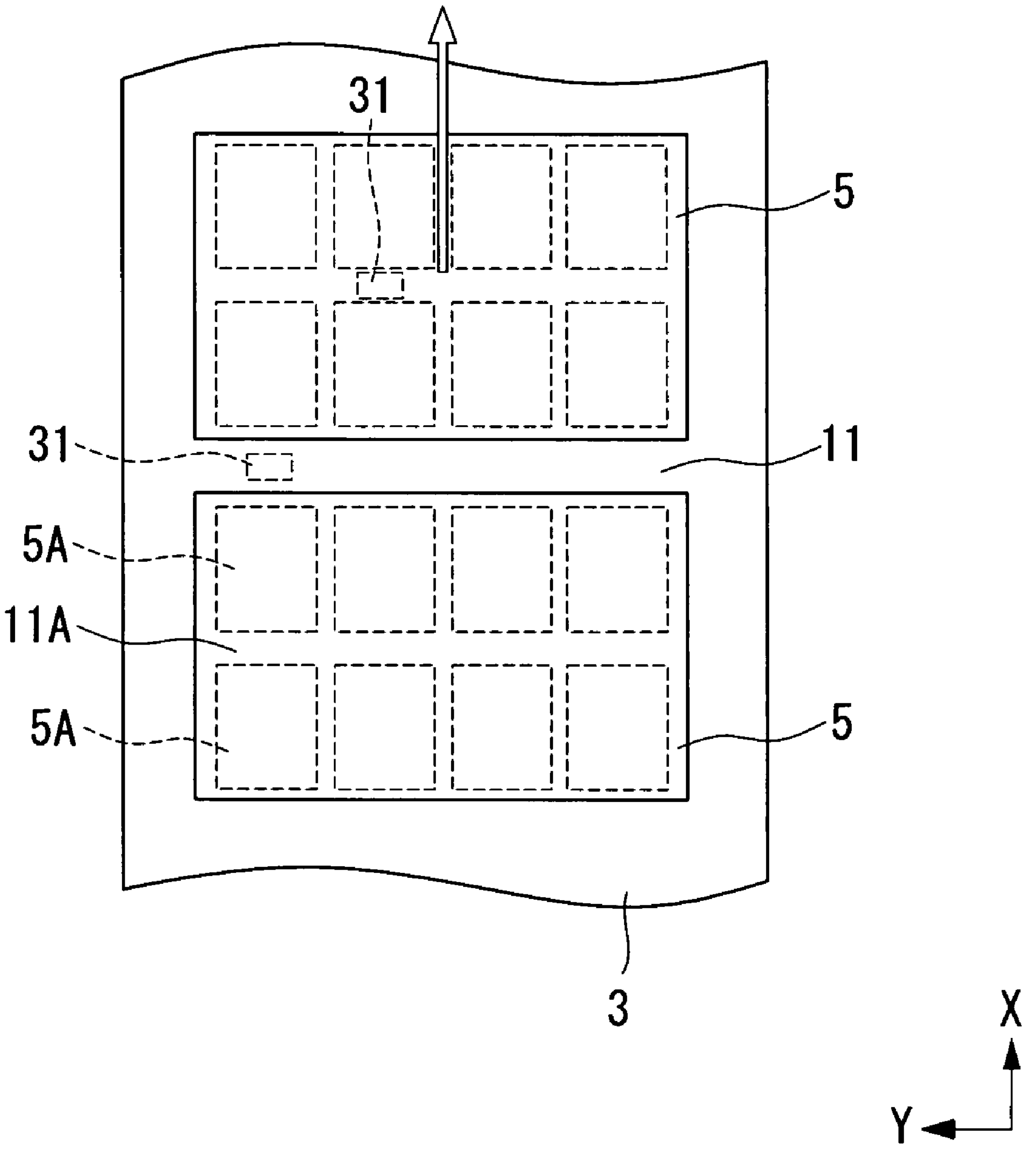
FIG. 14 is a schematic illustration for explaining still another method of detecting a blank level.

FIG. 14 is a schematic illustration for explaining still another method of detecting a blank level.

As shown in FIG. 14, the position of detecting the blank level (the position of the pixel 31) may be varied for each of the reflected light detectors 29.

What is claimed is:

1. A printed matter inspection device comprising:

a light source that irradiates a color printed matter as an inspection object with illuminating light;

a detector that detects the quantity of reflected light of each of a plurality of different color light beams from among reflected light reflected by the inspection object; and a controller that controls a timing of acquiring a detection signal of each of the color light beams from the detector, wherein the controller acquires a detection signal of selected one of the different color light beams for one of a plurality of non-print areas on the inspection object, and wherein the controller acquires a detection signal of newly selected one of the different color light beams for another one of the non-print areas.

2. The printed matter inspection device according to claim 1, wherein the controller controls the timing of acquiring the detection signal by controlling a timing of intermittently irradiating each of the plurality of non-print areas with the illuminating light.

3. The printed matter inspection device according to claim 1, wherein the controller controls the timing of acquiring the detection signal input from the detector so as to be intermittent.

4. The printed matter inspection device according to claim 1, wherein the light source includes a plurality of light sources respectively emit the different color light beams.

5. The printed matter inspection device according to claim 1, wherein the light source emits white light, and wherein the detector has a plurality of filters that respectively transmit the reflected different color light beams.

6. A printing press comprising the printed matter inspection device described in claim 1.

7. A printed matter inspection method comprising:

an inspection step of time-dividing and sequentially detecting the quantities of a plurality of reflected different color light beams reflected by one of a plurality of print areas on a color printed matter as an inspection object; and a detection step of detecting the quantity of selected one of the plurality of reflected color light beams for one of a plurality of non-print areas adjacent to the one of the print areas, wherein the inspection step and the detection step are repeatedly performed, and wherein one color light beam is newly selected from the plurality of different color light beams every time when the detection step is performed.

* * * * *